United States Patent Office 2,879,303
Patented Mar. 24, 1959

2,879,303

PROCESS FOR THE MANUFACTURE OF POLYENE COMPOUNDS

Otto Isler, Marc Montavon, and Rudolf Rüegg, Basel, and Paul Zeller, Neuallschwil, near Basel, Switzerland, assignors to Hoffmann-La Roche Inc., Nutley, N.J., a corporation of New Jersey No Drawing. Application July 13, 1956
Serial No. 597,568

Claims priority, application Switzerland July 22, 1955

3 Claims. (Cl. 260—611)

The invention concerns a process for the preparation of polyene compounds which comprises reacting 8-[2,6,6-trimethyl-cyclohexen-(1)-yl]-6 - methyl - octatrien - (3,5,7)-one-(2) [$\beta$-$C_{18}$-ketone] or 8-[2,6,6-trimethyl-cyclohexadien-(1,3)-yl]-6-methyl-octatrien-(3,5,7) - one - (2) [dehydro-$\beta$-$C_{18}$-ketone] in an inert solvent with an ethylidene-(1)-triarylphosphine-2-ether or an ethylidene-(1)-triarylphosphine-2-acetal or with the same compounds wherein the aryl groups carry alkyl or alkoxy radicals and heating the condensation product.

The starting materials may be obtained for example as follows: A 1-halo-ethane-2-ether or 1-halo-ethane-2-acetal, such as 1-bromo-2-methoxy-ethane or 1-bromo-2,2-diethoxy-ethane, is added to a solution of a triarylphosphine in benzene while stirring at room temperature. After several hours' standing and heating, the ethyltriaryl-phosphonium halide compound which separates is filtered or decanted off, washed with benzene, dried in vacuo and then suspended in absolute ether. In order to separate hydrogen halide, the equimolar amount of phenyllithium or butyllithium solution is added while stirring. An orange red or brown solution or suspension of the ethylidene-(1)-triarylphosphine compound is thus obtained; it is used directly for the condensation. Especially suitable starting materials are lower alkyl ethers of 2-hydroxy-ethyl-idene-(1)-triarylphosphines, such as the methyl, ethyl, propyl, butyl, isopropyl ether; aralkyl ethers, such as the benzyl and the phenethyl ether; aryl ethers, such as the phenyl ether; ethers with alcohols which possess the structure of internal acetals, e.g. with tetrahydropyranyl-(2)-alcohol, or with $\alpha$-alkoxy-alkanols, e.g. with $\alpha$-ethoxy-ethanol. Other appropriate starting materials are the 2-acetals of ethylidene-(1)-triarylphosphines, such as 2,2-dialkoxy-ethylidene-(1)-triarylphosphines, e.g. 2,2-diethoxy-ethylidene-(1)-triphenylphosphine, 2,2-dimethoxy-ethylidene-(1)-triphenylphosphine; 2,2-diaralkoxy-ethylidene-(1)-triarylphosphines, e.g. 2,2-dibenzyloxy-ethylidene-(1)-triphenylphosphine; 2,2-polymethylene-dioxy-ethylidene-(1)-triarylphosphines, e.g. 2,2-ethylene-dioxy-ethylidene-(1)-triphenylphosphine.

In the first stage of the synthesis the $\beta$-$C_{18}$-ketone or, respectively, the dehydro-$\beta$-$C_{18}$-ketone is condensed with the 2-substituted ethylidene-(1)-triarylphosphine compound; in the second stage the condensation product formed is converted into the polyene compound, triarylphosphine oxide being split off at the same time. The two reaction steps are preferably carried out in the same reaction vessel and without isolation of the intermediate products. It is recommended to use equivalent amounts of the reaction components or to use the triaryl-phosphine compound in excess. Furthermore, the reaction is suitably carried out in an inert solvent, such as ether, petroleum ether, benzene, dioxane, tetrahydrofurane, and the like. Preferably the starting materials are mixed in a stirring vessel at room temperature or at slightly elevated temperature, the air being best replaced by an inert gas such as nitrogen. Upon addition of a solution of the $\beta$-$C_{18}$-ketone or, respectively, of the dehydro-$\beta$-$C_{18}$-ketone to the solution of the ethylidene-(1)-triarylphosphine compound, the reaction which is exothermic starts immediately. Depending upon the kind of solvent used, the condensation product will remain in solution or it will separate, the coloration of the reaction mixture getting lighter in most cases. According to a preferred mode of procedure of the first step of reaction an ethereal solution of the $\beta$-$C_{18}$-ketone or, respectively, of the dehydro-$\beta$-$C_{18}$-ketone is added to a suspension or to a solution of the ethylidene-(1)-triaryl-phosphine compound in ether at room temperature. Upon standing the condensation product decomposes slowly into the polyene compound and triarylphosphine oxide. If the solution of the condensation product is heated the decomposition is fast. A preferred method for decomposing the condensation product consists in refluxing the reaction product in ether solution for several hours. Once the reaction is completed, the polyene compound produced may be isolated by extracting the triarylphosphine oxide formed with water from the organic phase, and by drying and evaporating the latter. The polyene compound produced may then be purified from impurities, such as organic phosphorus compounds, by dispersing between solvents and by chromatography.

When starting from an ethylidene-(1)-triarylphosphine-2-ether, e.g. from 2-methoxy-ethylidene-(1)-triphenylphosphine or 2 - [tetrahydropyranyloxy - (2)]ethylidene-(1)-triphenylphosphine and $\beta$-$C_{18}$-ketone, or respectively, dehydro-$\beta$-$C_{18}$-ketone, the process described herein leads to the corresponding vitamin A-ether or, respectively, vitamin $A_2$ ether. When a 2-acetal, such as 2,2-diethoxy-ethylidene-(1)-triphenylphosphine, is used instead of the 2-ethers referred to above, the corresponding vitamin A acetals, e.g. vitamin A aldehyde diethyl acetal or, respectively, vitamin $A_2$ aldehyde diethyl acetal are obtained; the acetals and those ethers of vitamin A and vitamin $A_2$ which have acetal structure may be converted into vitamin A aldehyde or vitamin A or, respectively, into vitamin $A_2$ aldehyde or vitamin $A_3$ by hydrolysis in acid medium. The hydrolysis may e.g. be performed in a manner per se by treatment of e.g. vitamin A tetrahydro pyranyl ether, vitamin A aldehyde diethyl acetal, vitamin $A_2$ tetrahydro pyranyl ether or vitamin $A_2$ aldehyde diethyl acetal with an aqueous mineral acid, such as sulfuric acid, or with a non-aqueous or an aqueous organic acid, such as acetic acid or p-toluenesulfonic acid. It is preferred to hydrolyze the vitamin A ethers with acetal structure, such as the tetrahydro pyranyl or $\alpha$-alkoxy-alkyl ethers, in alcoholic solution by means of p-toluene-sulfonic acid at room temperature or at slightly elevated temperature, whereas the vitamin A acetals are suitably hydrolyzed by means of aqueous sulfuric acid.

EXAMPLE

Vitamin A methyl ether

A solution of 2.4 g. of 8-[2,6,6-trimethyl-cyclohexen-(1) - yl] - 6 - methyl - octatrien - (3,5,7) - one - (2) in 40 cc. of absolute ether is added within 5 minutes, while stirring, in a nitrogen atmosphere to an orange red solution of [2 - methoxy - ethylidene - (1)] - triphenylphosphine—obtained by treatment of 4 g. of [2-methoxy-ethyl]-triphenylphosphonium bromide (melting point 195–197°) with 0.84 g. of phenyllithium in 50 cc. of absolute ether. Then the reaction mixture is refluxed for 5–6 hours and cooled. The undissolved material is filtered off and the filtrate is washed with water. The ethereal solution is dried over sodium sulfate and concentrated. The residual crude material is dissolved in a small amount of petroleum ether and filtered through a short column of aluminum oxide according to Brockmann (activity grade III) in order to remove phosphorus containing impurities. The petroleum ether is distilled off and vitamin A methyl ether is obtained. Maximum of absorption in the ultraviolet at 326 mµ (in petroleum ether).

We claim:

1. A process for the production of a member of the group consisting of vitamin A ether, vitamin $A_2$ ether, vitamin A acetal and vitamin $A_2$ acetal which comprises condensing in an inert atmosphere approximately equimolecular proportions of a member of the group consisting of 8-[2,6,6-trimethyl-cyclohexen-(1)-yl]-6-methyl-octatrien - (3,5,7) - one - (2) and 8 - [2,6,6 - trimethyl-cyclohexadien - (1,3) - yl] - 6 - methyl - octatrien-3,5,7)-one-(2) in an inert solvent selected from the group consisting of ether, petroleum ether, benzene, dioxane, and tetrahydrofurane at a temperature from about room temperature to reflux temperature with a member of the group consisting of ethylidene-(1)-triarylphosphine-2-ether and ethylidene-(1)-triarylphosphine-2-acetal and heating the condensation product to obtain said vitamin A compound.

2. A process as in claim 1 wherein 2-methoxy-ethylidene-(1)-triphenylphosphine is used as starting material.

3. A process for the production of vitamin A methyl ether which comprises condensing 8-[2,6,6-trimethyl-cyclohexen - (1) - yl] - 6 - methyl - octatrien - (3,5,7) - one-(2) in an inert atmosphere with approximately an equimolecular portion of [2-methoxy-ethylidene-(1)]-triphenylphosphine in ether at a temperature from about room temperature to reflux temperature and refluxing the condensation product to obtain said vitamin A methyl ether.

References Cited in the file of this patent

Milas: Vitamins and Hormones, vol. V, 1947, pp. 1 to 38.

Van Dorp et al.: Recueil Trav. Chem., vol. 68, pp. 604–612 (1949).

Wittig et al.: Chem. Berichte, vol. 87, pp. 1318-1330 (1954).